United States Patent [19]

Kanetake et al.

[11] 3,937,794

[45] Feb. 10, 1976

[54] METHOD OF MANUFACTURING FINE POWDERS OF METAL SULFIDE

[75] Inventors: Norio Kanetake, Tokyo; Ikuo Maruyama, Kawasaki; Katsuyuki Morita, Fujisawa, all of Japan

[73] Assignee: Kabushiki Kaisha Kito, Japan

[22] Filed: Aug. 2, 1973

[21] Appl. No.: 384,838

Related U.S. Application Data

[63] Continuation-in-part of Ser. No. 144,809, May 19, 1972, Pat. No. 3,769,098.

[52] U.S. Cl. .................. 423/561; 423/53; 423/59; 423/135; 423/492; 423/495

[51] Int. Cl.² C01G 37/00; C01G 37/04; C01F 7/58; C01F 7/70

[58] Field of Search ............. 423/561, 492, 562, 53, 423/59, 135

[56] References Cited

UNITED STATES PATENTS

| | | | |
|---|---|---|---|
| 2,311,459 | 2/1943 | Muskat | 423/492 |
| 2,358,661 | 9/1944 | Sarge | 423/561 |
| R17,001 | 6/1928 | Haglund | 423/561 |

FOREIGN PATENTS OR APPLICATIONS

| | | | |
|---|---|---|---|
| 630,042 | 10/1949 | United Kingdom | 423/561 |
| 1,558,050 | 2/1969 | France | 423/561 |

OTHER PUBLICATIONS

Derwent, Belgium Report No. 61 A, Dec. 31, 1959, p. A8.
Derwent Belgian Patents Report, Vol. 74B, Apr. 28, 1961.
Belg. 596,637: Purification of TiCl₄, National Lead Company, 2/15/61, 9 pages in all, P.A29 pertinent.
Mellor: A Comprehensive Treatise on Inorganic & Theoretical Chemistry, Vol. 11, p. 430 (1931).

*Primary Examiner*—Edward Stern
*Attorney, Agent, or Firm*—McGlew and Tuttle

[57] ABSTRACT

An improved method of making finely divided, dry metal halides and sulfides, such as chromium chloride and chromium sulfide which are suitable for use as lubricants and wear-proof and corrosion-proof agents for metals.

4 Claims, 8 Drawing Figures

METHOD OF MANUFACTURING FINE POWDERS OF METAL SULFIDE

CROSS-REFERENCE TO PRIOR APPLICATION

This application is a continuation-in-part of co-pending Application Ser. No. 144,809, filed on May 19, 1971 which issued as a patent on October 30, 1973, now U.S. Pat. No. 3,769,098.

BACKGROUND OF THE INVENTION

1. Field of the Invention

This invention relates to an improvement in the method of manufacturing fine powders of metal halide.

2. Description of the Prior Art

Chromium chloride, chromium bromide, aluminum chloride, aluminum bromide, etc. are used for surface treatment, such as in chromium cementation; aluminum cementation; chromium evaporation and aluminium evaporation of steel products. These metal halides are also used as the materials for the manufacture of pure metallic powders of these metals.

For the manufacture of these metal halides, a wet system has generally been adopted so far. However, in the case of the wet system, since a hydrate is liable to be produced, it is difficult to obtain an anydrous metal halide. Also, since a metal halide containing moisture produces oxide upon the surface treatment of steel products, such a metal halide containing moisture cannot be employed for surface treatment of steel.

On the other hand, in the case of a dry system, for instance, chromium chloride can be manufactured by the reaction of hydrogen chloride gas with chromium as described below:

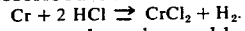

However, chromium chloride, when produced, assumes the shape of a needle or mass, and in order to make such chromium chloride into fine powders, these materials must be mechanically pulverized because chromium chloride has the properties of deliquescence. However, such pulverization is industrially difficult in operation and the obtaining of yields of chromium chloride powder in abundance is impossible.

SUMMARY OF THE INVENTION

This invention aims at providing a method of manufacturing the fine powders of anhydrous metal halide industrially and easily. The invention also relates to a method of manufacturing fine powders of metal halide, which comprises evaporating a metal halide by heating to its fusing point or higher, an occluded body of the metal halide in a receptacle in a heating chamber, and then drying an inert gas at a low temperature; the inert gas is supplied in the heating chamber and the metal halide is evaporated and quenched, whereby, the halide is made into fine powders and the fine powders of that metal halide are emitted from the heating chamber in a dry state.

Further, this invention also relates to a method of manufacturing a fine powder-like lubricant consisting of chromium sulfide. The invention further relates to a process of manufacturing a fine powder-like lubricant, which comprises evaporating chromium halide by heating to its fusing point or higher, an occluded body of chromium halide in a receptacle in the heating chamber, and then supplying a dried mixed gas consisting of inert gas and hydrogen sulfide gas at a low temperature to the heating chamber; by the reaction of evaporated chromium halide with hydrogen sulfide gas, chromium sulfide is produced and chromium sulfide is quenched, whereby, the chromium sulfide is made into fine powders, and then the fine powders of chromium sulfide are emitted to the heating chamber in a dry state.

Furthermore, this invention relates to a process of wear-proof and corrosion-proof treatment by which both improved wear-proof and corrosion-proof metal products, such as steel products, or non-ferrous metals can be obtained.

The process of improving wear-proof metal products, such as, for instance, gears made of carbon steel, so far has been a known chemical process. For example, carburizing, hardening or nitriding and sulphurizing is known, and a physical process, such as induction hardening, is also known. On the other hand, other means for obtaining wear-proof liquid-like lubricant or powder-like lubricant are also known.

However, in the case of the improvement in wear-proofing mentioned above, there was a defect that the simultaneous improvement of wear-proofing and corrosion-proofing is impossible.

This invention aims at providing a process of wear-proofing and corrosion-proofing treatment by which both wear-proof and corrosion-proof metals can be improved. The invention relates to a process of wear-proof and corrosion-proof treatment of metal products, which comprises forming a chromium zone beforehand on the surface of metal products, such as iron and steel, or non-ferrous metals; and reacting the chromium with nitrogen, whereby chromium nitride is produced on the surface of the metal products.

For an understanding of the principles of the invention, reference is made to the following description of typical embodiments thereof as illustrated in the accompanying drawings.

DESCRIPTION OF PREFERRED EMBODIMENTS

Figure 1:
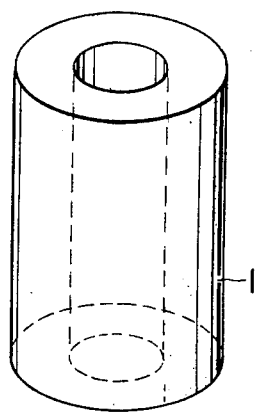
FIG. 1 is a perspective view showing a hollow cylindrical metal halide occluded body.
Figure 2:
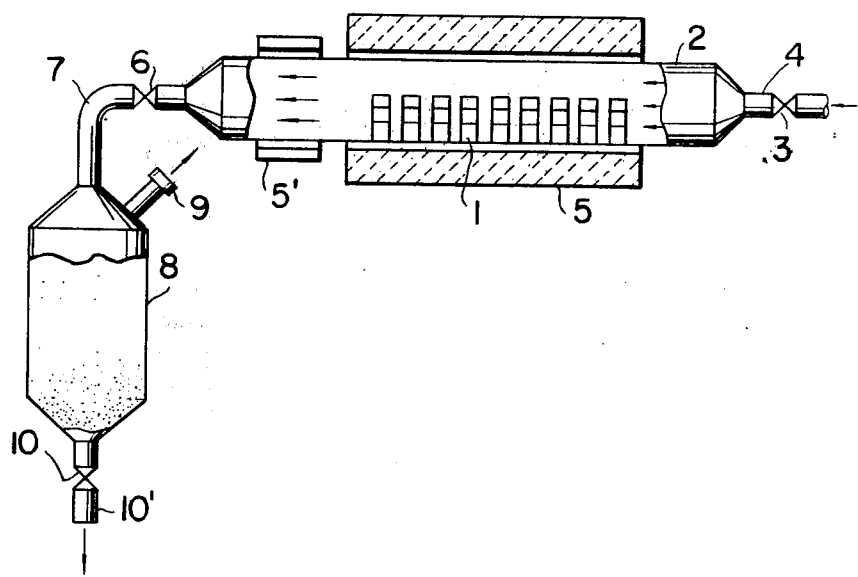
FIG. 2 is a longitudinal sectional side view showing manufacture of metal halide according to this invention.

First, as shown in FIG. 1, a metal halide occluded body 1, formed in the shape of a hollow cylinder, is manufactured from a porous body out of the same kind of metal (chromium in case of chromium halide); in this process, metal halide (for instance, chromium halide) is occluded in such a way that it does not contain carbon and oxidizing agent, such as moisture and hydroxyl; the resulting metal halide occluded body is placed in a retort 2 (shown in FIG. 2).

Next, as seen in FIG. 2, inert gas, such as argon or nitrogen gas is supplied from a feed pipe 4 with a valve 3 connected to one end of the retort 2 and the air in the retort is replaced by the inert gas. Then, heating was carried out from the outer periphery of the retort 2 by means of an electric furnace 5 and thus a stream of said metal halide is generated in the retort. Then, a dried inert gas at low temperature is blown into the retort from the feed pipe 4 at one end of the retort 2. Evaporated metal halide in said retort is quenched with the inert gas (in order to perform a further quenching, the retort 2 is sometimes cooled by means of a cooling means 5') whereby the evaporated metal halide is made into fine powders and the stream of fine powders of this metal halide in inert gas is withdrawn into a storage tank 8 which is maintained in a dried condition from the other end of the retort 2 through a feed pipe 7 with a valve 6 by means of which said inert gas stream is admitted.

At the upper part of the storage tank 8, there is a filter 9 for venting the inert gas and preventing the escape of fine powders of the metal halide; at the lower part of the storage tank 8, there is an exhaust port 10' having a valve 10.

Figure 3:
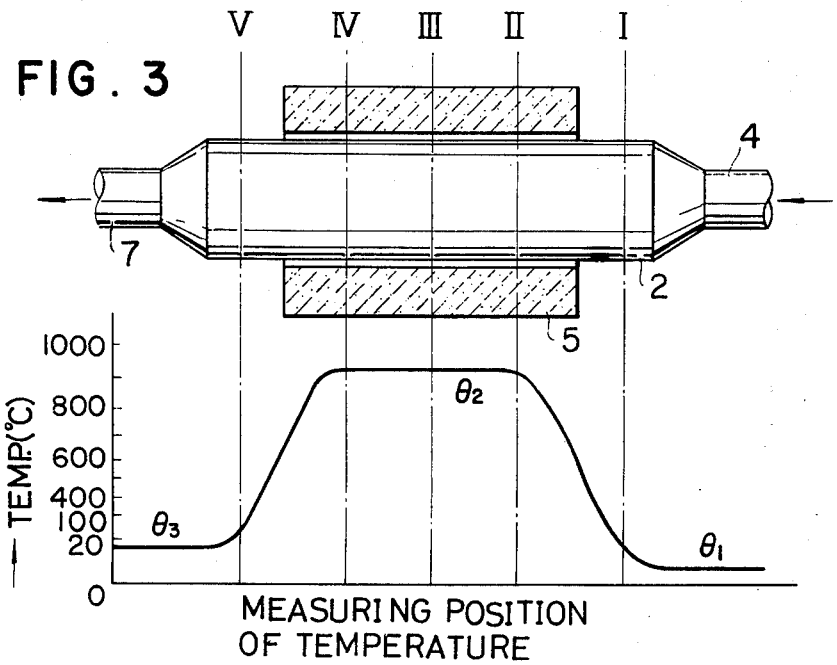
FIG. 3 is a view showing a longitudinal temperature distribution of a retort.

FIG. 3 shows a longitudinal temperature distribution curve for the retort 2, in which: $\theta_1$ indicates a temperature lower than the fusing point of metal halide, $\theta_2$ indicates a temperature at the heating zone of the retort, and this temperature is higher than the fusing point of metal halide, $\theta_3$ indicates a temperature lower than $\theta_2$, and this temperature is lower than the fusing point of metal halide; in particular, there is no need of heating or heat retaining, but rather a remarkably lower temperature (about 600°–900°C) than $\theta_2$ is suitable for making evaporated metal halide into fine powders.

As to the temperature distribution in the retort, shown in section in FIG. 3, it is necessary to maintain the temperature where inert gas flows lower than the temperature at the point where the metal halide occluded body is heated and it is also necessary to make the former temperature lower than the fusing point of metal halide in order to solidify the evaporated metal halide.

Further, in carrying out this invention, the heating chamber, (for instance, the retort) may be longitudinally or obliquely directed, instead of laterally, as shown in the drawing; or its section may be circular, oval, square or of other shape.

Instead of the electric furnace, a gas furnace or a heavy oil furnace may be used as the heating furnace. Further, any outer-heat system or inner-heat system or both inner- and outer-heat system may be adopted as a heating chamber.

Figure 4:
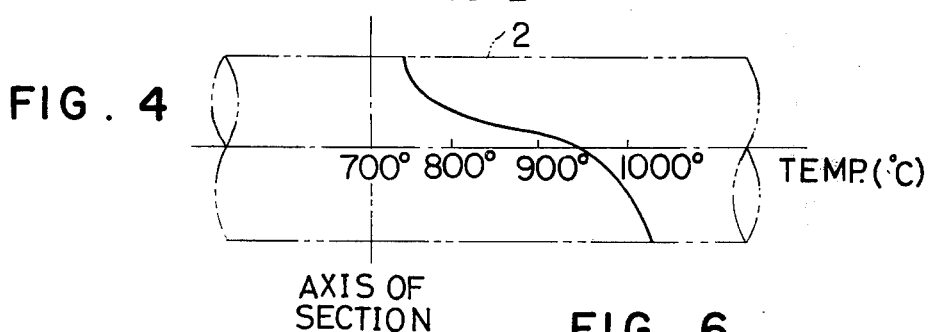
FIG. 4 is a view showing a temperature distribution of a section of the retort.

The invention is illustrated further below with reference to the embodiments of this invention described herein:

The retort 2 in the apparatus shown in FIGS. 2 and 3 having a cylindrical retort is made of stainless SUS 27 of 5cm in diameter and 2m in length. Into this retort is introduced 100 kg of a chromium chloride halide occluded body consisting of chromium chloride ($CrCl_2$) about 20 – 60%, iron (fe) 0.5% or less, aluminum oxide ($Al_2O_3$) or silicon oxide ($SiO_2$) about 5 – 30% and remaining amount of chromium. Then, argon is supplied to the retort from the feed pipe 5, thereby expelling the air in the retort and then the retort is heated by means of the electric furnace 5. As the heating condition, $\theta_1$ shown in FIG. 3 is determined at 20°– 100°C, $\theta_2$ at 1000°C, (higher than 815°C), the fusing point of chromium chloride, $\theta_3$ at 200°– 400°C ( in order to perform further cooling, a cooling means 5' is employed and $\theta_3$ is sometimes determined at 30°– 100°C) 20 l/min. of argon gas is supplied from the feed pipe 4 and a temperature distribution of the section of the retort inside is made, as shown in FIG. 4. The chromium chloride which is evaporated in the retort is quenched with argon gas to make into fine powders, and thus, the fine powders of anhydrous chromium chloride of 0.5–1μ in diameter and of 99.9% in high purity was obtained.

This invention is carried out as described above, namely, the occluded metal halide body is placed in the heating chamber and is heated to its fusing point or higher; the metal halide is evaporated, dispersed, and then a dried inert gas at low temperature is introduced into the heating chamber. The metal halide which is evaporated and dispersed is quenched and solidified; therefore, the fine powders of metal halide thus obtained can be easily and continuously produced in abundance by skillfully utilizing the evaporating and dispersing action, as well as the cooling and solidifying action. Further, the cooling takes place with the inert gas, so that oxidation can be prevented and fine powders of anhydrous metal halide of high purity can be manufactured.

Further, instead of the inert gas used in the above-mentioned illustrative embodiment, a dried mixed gas at low temperature consisting of 80% inert gas (for example, argon or nitrogen gas) and 20% hydrogen sulfide gas, is used; the mixed gas is introduced in the heating chamber from the feed pipe 4 at one end of the retort 2, and chromium sulfide is produced by the reaction of chromium halide which is evaporated in the retort with hydrogen sulfide gas and chromium sulfide is quenched; (in order to perform a further quenching, the retort 2 is sometimes cooled by means of the cooling means 5'); in this manner, chromium sulfide is made into fine powders. Further, it is remarked, that the fine powders of this chromium sulfide are stored in the storage tank 8, which is maintained in a drying condition. The chromium sulfide is introduced from the other end of the retort 2 through the feed pipe 7 with the valve 6 by means of said gas blown in. In this case, therefore, chromium sulfide, suitable as a lubricant, can easily and continuously be produced in abundance by skillfully utilizing the reaction of the chromium halide evaporated and dispersed with the hydrogen sulfide gas evaporated and dispersed, and the quenching and solidifying action by means of feed gas.

As explanation of the invention is made below with reference to FIGS. 5 through 8 in other illustrative embodiments and examples.

EXAMPLE 1

A carbon steel gear is provided, having a chemical composition of C: 0.42%, Mn: 0.68%, Si: 0.21%, P: 0.015% and S: 0.026%. This gear is placed with a chromium chloride generating substance in an atmospheric furnace in which the atmosphere can be controlled from the outside. After the air in the furnace is eliminated, a temperature in the furnace is maintained at 1000°C for 5 hours, chromium is thus cemented on the surface of the gear and thereafter, the gear is at once put in oil and quenched so that hardening of the gear takes place.

Figure 5:
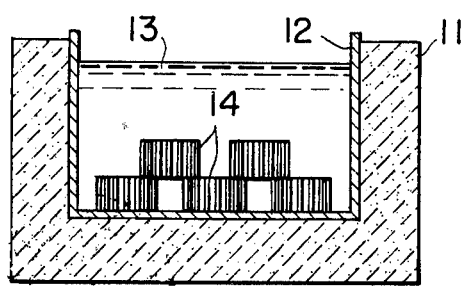
FIG. 5 is a longitudinal sectional side view showing the reaction of sulphur with metal products cemented with chromium or plated with chromium, performed in salt.
Figure 6:
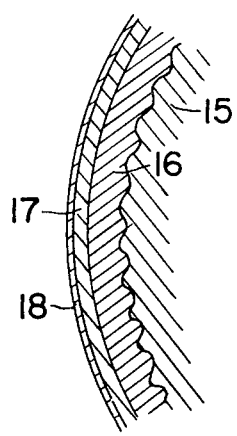
FIG. 6 is an enlarged schematic view showing a section through the surface of the metal products obtained according to the invention after a wear-proof and a corrosion-proof treatment was performed.
Figure 7:
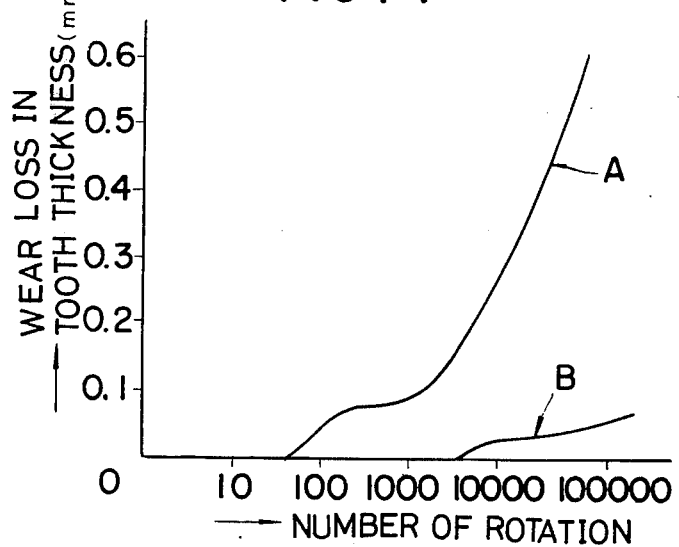
FIG. 7 is a diagram graphically showing a result of a wear-proof and corrosion-proof test.

Next, as shown in FIG. 5, in the case 12 provided in the electric furnace 11, the quenched gears 14 are immersed for one hour and heated at 200°C in a mixed salt 13 of sodium sulfate (85%) and potash alum (15%). The gears are then aircooled. As shown in FIG. 6, a matrix 15 of tempered martensite, a chromium cementation zone 16 (15μin average thickness), a chromium zone 17 (20μ in average thickness) and a chromium sulfide zone 18 (2μ in average thickness) are produced in turn. The structure of the matrix is illustrated in section by FIG. 6. A wear-proof and a corrosion-proof treated gear of HRC49 in surface hardness was thus obtained.

In similar fashion, another gear consisting of carbon steel of the same composition as described above is heated at 1000°C, and after oil hardening, quenching is performed at 200°C and thus a heat-treated gear of HRC49 in hardness was also obtained.

The two kinds of gears obtained, as described above, are engaged with gears of the same kind respectively without feed oil and are rotated. Then, a wear loss (decreased amount of tooth thickness) of tooth in pitch circle was measured. The test results showed that merely heat-treated gears are inferior in wear resistance, as indicated by line A of FIG. 7, and such a gear has no corrosion resistance. However, a wear- and corrosion-resistant treated gear, according to this invention, is remarkably excellent in wear resistance, as indicated by line B of FIG. 7 and also has corrosion-resistance.

EXAMPLE 2

Figure 8:
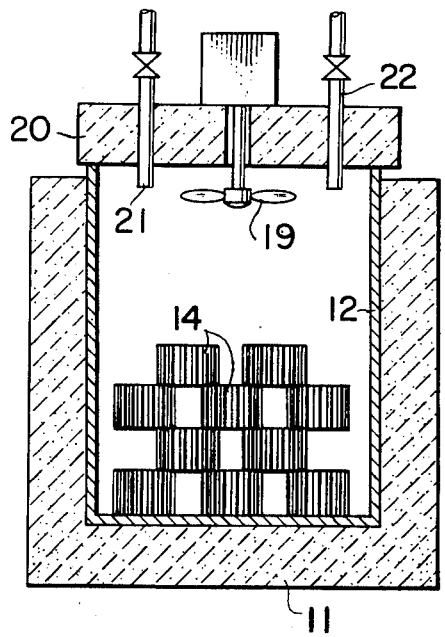
FIG. 8 is a longitudinal sectional side view showing appratus in which treatment by the reaction of chromium with sulphur is performed in the mixed gas atmosphere.

Chromium cementation gears 14 which are made of carbon steel obtained with the same composition as that of Example 1 are placed in case 12 of electric furnace 11 as shown in FIG. 8. A mixed gas of 70% argon and 30% $H_2S$ is supplied from gas feed port 21 in lid 20 on which fan 19 is mounted. The air in case 12 is vented from a port hole 22. Thereafter, the gears were taken out after heating at 600°C for one hour.

In this example, too, a chromium sulfide zone is formed on the surface of the chromium zone on the gear and the same wear-resistance and corrosion-resistance, as in the case of Example 1, was obtained.

EXAMPLE 3

After a shaft made of brass is plated (5μin thickness) with chromium, this shaft is reacted with sulfur in mixed salt, as shown in FIG. 1, and thus chromium sulfide (1μin thickness) was produced on the surface.

When this shaft was inserted in the hole of a bearing and was slided reciprocatingly, wear loss was lowered to 1/5 as compared with a shaft made of brass which was not so treated.

Since this invention is constituted as described hereinabove, it has been found that the chromium sulfide has a lubricating property, namely, a wear-resistance is produced on the surface of the chromium zone having corrosion-resistance by merely performing a treatment such as the reaction of the chromium zone in sulfide after the chromium zone was formed on the surface of metal products merely by chromium cementation or chromium plating. In this manner, both wear-resistance and corrosion-resistance of the gears can be improved.

While specific embodiments of the invention have been shown and described in detail to illustrate the application of the principles of the invention, it will be understood that the invention may be embodied otherwise without departing from such principles.

What is claimed is:

1. The process of producing the sulfide of chromium or aluminum which comprises the steps of: placing a chromium or aluminum chloride or bromide occluded mass in the shape of a porous hollow cylinder which does not contain carbon, moisture, hydroxyl ions or oxidizing agent in a closed heating chamber; heating said mass to at least the fusing point of said chromium or aluminum chloride or bromide; vaporizing the chromium or aluminum chloride or bromide produced thereby in a stream of a dried gaseous mixture supplied to said chamber at a low temperature, said low temperature being lower than the temperature at the point where the chromium or aluminum chloride or bromide occluded body is heated and lower than the fusing point of said bromide or chloride, and said gaseous mixture consisting of an inert gas and hydrogen sulfide gas, and thus directly reacting the vaporized chromium or aluminum chloride or bromide with the hydrogen sulfide component of said dried gaseous mixture whereby the corresponding metal sulfide is produced; and quenching and recovering the chromium or aluminum sulfide so produced in the form of a fine dry powder in the presence of the said inert gaseous component of the dried gaseous mixture.

2. The process of manufacturing chromium sulfide, according to claim 1, wherein said inert gas is selected from the group consisting of argon and nitrogen.

3. The process of manufacturing chromium sulfide, according to claim 1, wherein chromium chloride is used.

4. The process of manufacturing chromium sulfide, according to claim 1, wherein chromium bromide is used.

* * * * *